(12) United States Patent
Alfaro Fonseca

(10) Patent No.: US 9,849,728 B2
(45) Date of Patent: Dec. 26, 2017

(54) CAR SEAT OCCUPANCY ALERT SYSTEM

(71) Applicant: Hector Enrique Alfaro Fonseca, Wildomar, CA (US)

(72) Inventor: Hector Enrique Alfaro Fonseca, Wildomar, CA (US)

( * ) Notice: Subject to any disclaimer, the term of this patent is extended or adjusted under 35 U.S.C. 154(b) by 0 days.

(21) Appl. No.: 15/290,436

(22) Filed: Oct. 11, 2016

(65) Prior Publication Data

US 2017/0101055 A1    Apr. 13, 2017

Related U.S. Application Data

(60) Provisional application No. 62/240,594, filed on Oct. 13, 2015.

(51) Int. Cl.
*B60Q 9/00*    (2006.01)
*B60C 9/00*    (2006.01)
*B60N 2/26*    (2006.01)
*B60N 2/00*    (2006.01)

(52) U.S. Cl.
CPC .............. *B60C 9/00* (2013.01); *B60N 2/002* (2013.01); *B60N 2/26* (2013.01)

(58) Field of Classification Search
None
See application file for complete search history.

(56) References Cited

U.S. PATENT DOCUMENTS

| | | | |
|---|---|---|---|
| 7,348,889 B2 * | 3/2008 | Monzo | B60N 2/002 180/273 |
| 9,139,128 B1 * | 9/2015 | Lemons | B60Q 1/00 |
| 9,403,437 B1 * | 8/2016 | McDonald | B60K 37/02 |
| 2009/0079557 A1 * | 3/2009 | Miner | B60N 2/002 340/457.1 |
| 2016/0200250 A1 * | 7/2016 | Westmoreland | B60Q 9/00 340/457.1 |

* cited by examiner

*Primary Examiner* — Brent Swarthout
(74) *Attorney, Agent, or Firm* — Dale J. Ream

(57) ABSTRACT

A car seat occupancy alert system includes an occupancy sensor imbedded in or positioned atop the seat portion of an infant car seat in a vehicle. The alert system includes an engine sensor configured to detect when a vehicle engine has been turned off. The occupancy sensor may be electrically connected to a controller (e.g. a control circuit or process). When the engine is deactivated, the controller determines if the car seat is still occupied after a predetermined time and, at first, energizes a dash light as a gentle reminder for the driver to retrieve the child and, later, actuates more aggressive audio and visual alarms to alert the driver and public to a child left in the vehicle. The alert system also provides an interrupt so that a user can add additional time before an alarm is actuated.

7 Claims, 16 Drawing Sheets

CAR SEAT OCCUPANCY ALERT SYSTEM

REFERENCE TO RELATED APPLICATIONS

This application claims the benefit of Provisional patent application No. 62/240,594, filed Oct. 13, 2015 entitled Car Seat Occupancy System, which is incorporated herein in its entirety.

BACKGROUND OF THE INVENTION

This invention relates generally to vehicle safety devices and, more particularly, to a car seat occupancy alert system for first alerting a driver to retrieve a child from a vehicle car seat upon switching off the vehicle's engine and then to alerting the broader public around the vehicle that a child has been left in the car.

The news reports about children left in hot cars are tragic and too frequent. With an increasing frequency, parents sometimes forget that their infant or toddler is strapped into a rear seat car seat when they park and leave their vehicle. Specifically, a parent may forget to drop the child off at daycare and go on to work—leaving the infant in a hot car with the windows rolled up. Or, a parent may intentionally or unintentionally leave their young child in the car seat while they run into a store to purchase some items. The car becomes too hot and the child suffers harm or even death. Unfortunately, there have also been situations when a parent has allegedly intentionally left an infant in a hot car—leading to a tragic death.

Therefore, it would be desirable to have a child car seat occupancy alert system that first provides a gentle visual reminder to a driver almost immediately following shutting of the engine to retrieve a child from a rear seat infant car seat. Further, it would be desirable to have a child car seat occupancy alert system that follows the gentle visual reminder with a more vigorous and public audio and visual alarm if the child has not been removed after a predetermined amount of time. In addition, it would be desirable to have a child car seat occupancy alert system that includes an interrupt switch that enables a driver to proactively add additional time to the system to enable him to accomplish brief tasks with the engine turned off without the alarms activating, e.g. pumping gas.

SUMMARY OF THE INVENTION

A car seat occupancy alert system according to the present invention includes an occupancy sensor imbedded in or positioned atop the seat portion of an infant car seat in a vehicle. The alert system includes an engine sensor configured to detect when a vehicle engine has been turned off. The occupancy sensor may be electrically connected to a controller (e.g. a control circuit or process). When the engine is deactivated, the controller determines if the car seat is still occupied after a predetermined time and, at first, energizes a dash light as a gentle reminder for the driver to retrieve the child and, later, actuates more aggressive audio and visual alarms to alert the driver and public to a child left in the vehicle. The alert system also provides an interrupt so that a user can add additional time before an alarm is actuated. It is understood that the present invention may be applied to a family automobile such as a car or minivan as well as to multi-seat vehicles such as a van or even school bus. In the case of a bus, the alert system may be configured to activate an alarm if even one seat is still occupied a predetermined time after the engine has been deactivated.

Therefore, a general object of this invention is to provide a child car seat occupancy alert system that at first provides a gentle visual reminder to a driver almost immediately following shutting of the engine to retrieve a child from a rear seat infant car seat and then provides a more aggressive audio and/or visual alarm after a predetermined amount of time.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an isolated view on an enlarged scale taken from FIG. 1a;

FIG. 2a is a top view of the alert system as in FIG. 1a;

FIG. 2b is a sectional view taken along line 2b-2b of FIG. 2a;

FIG. 3b is an isolated view on an enlarged scale taken from FIG. 3a;

FIG. 4b is an isolated view on an enlarged scale taken from FIG. 4a;

FIG. 9b is a sectional view taken along line 9b-9b of FIG. 9a;

DESCRIPTION OF THE PREFERRED EMBODIMENT

Figure 1A:
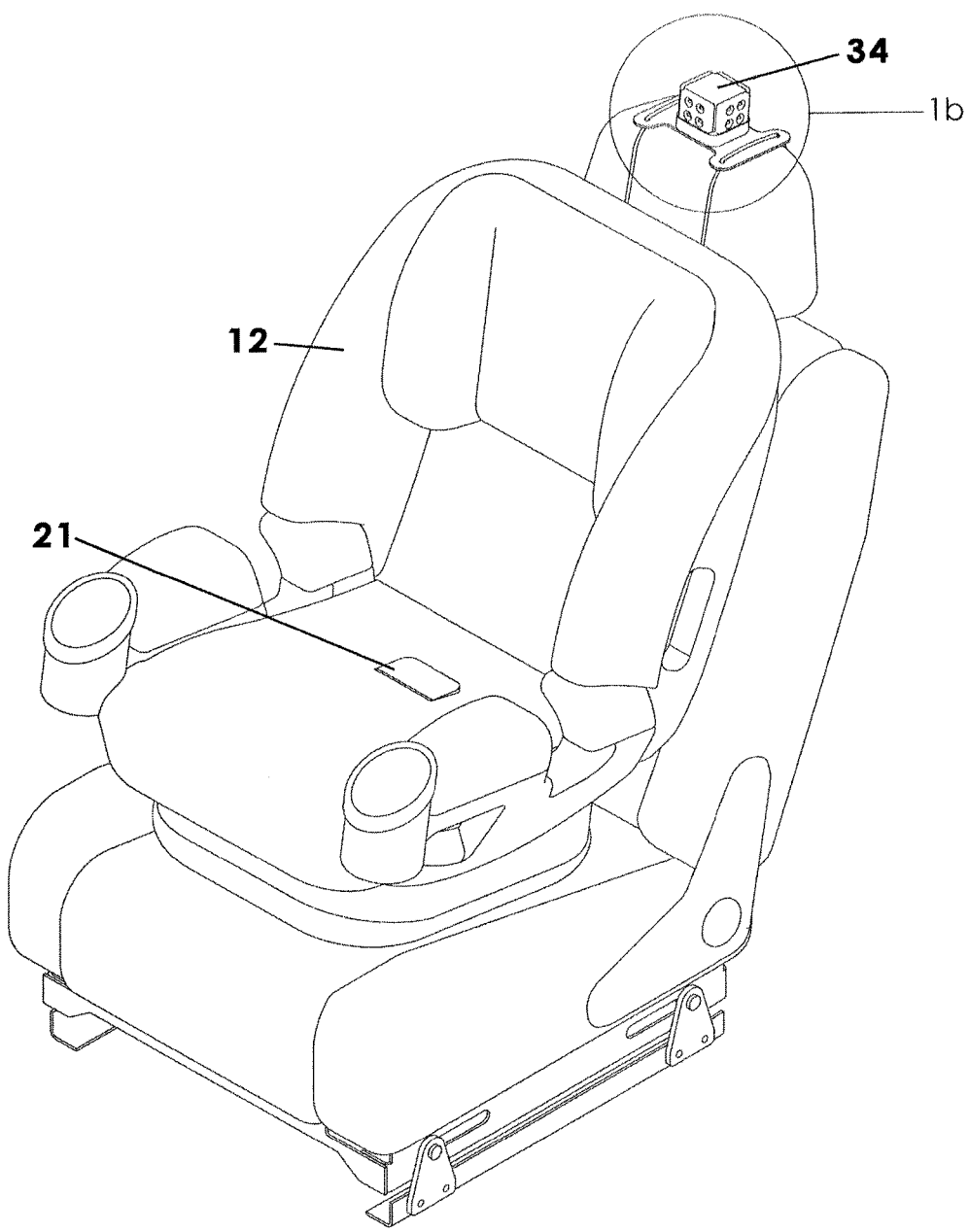
FIG. 1a is a perspective view of a car seat occupancy alert system according to a preferred embodiment of the present invention, illustrated in use on a baby car seat.
Figure 1B:
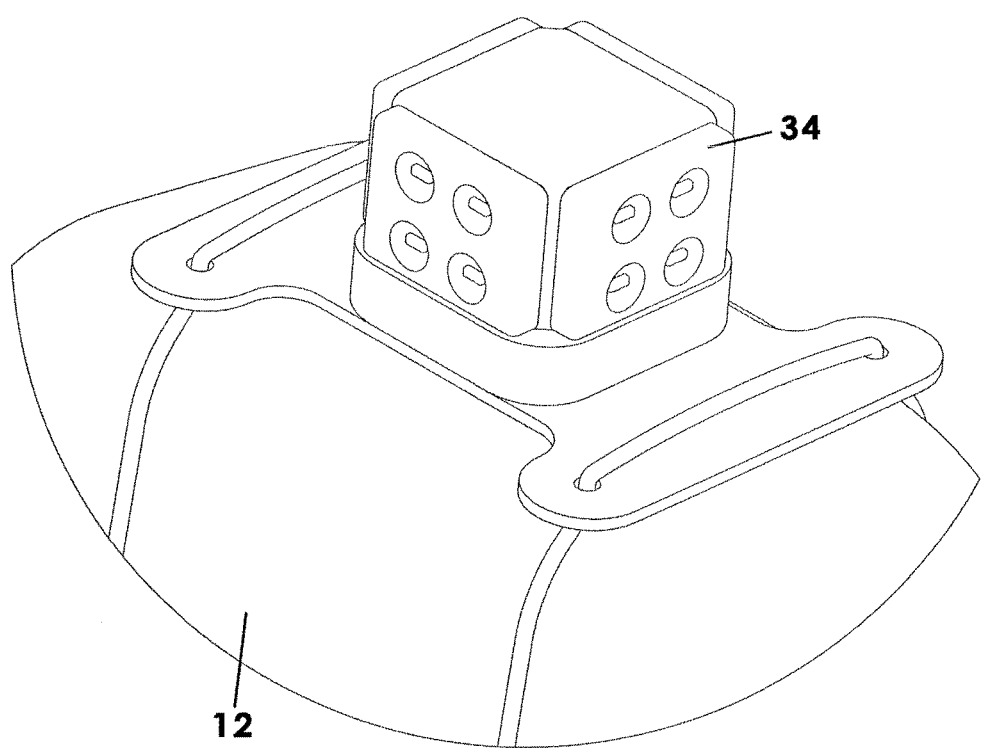
Figure 2A:
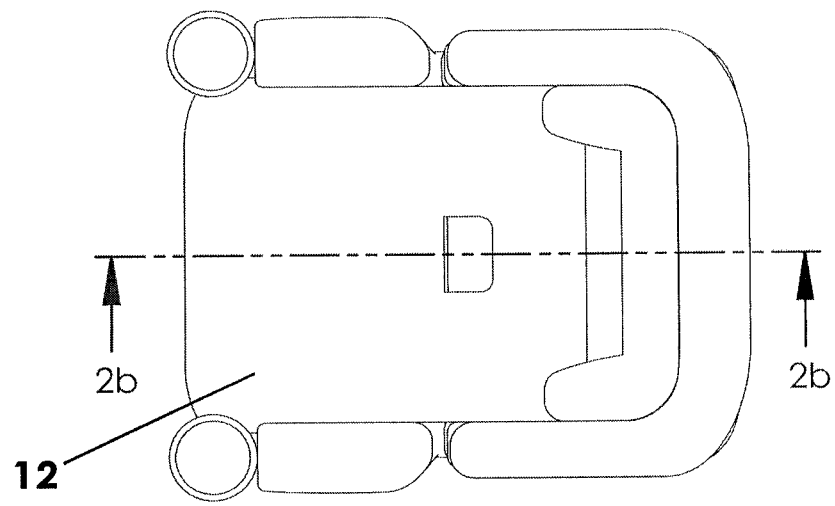
Figure 2B:
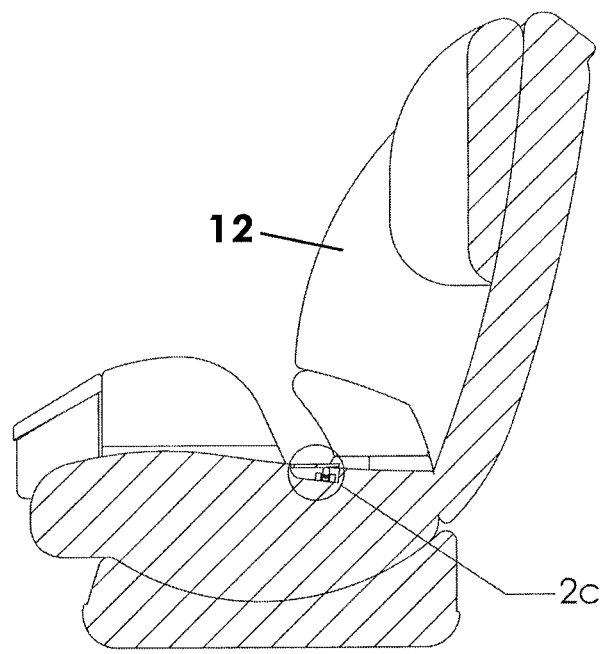
Figure 2C:
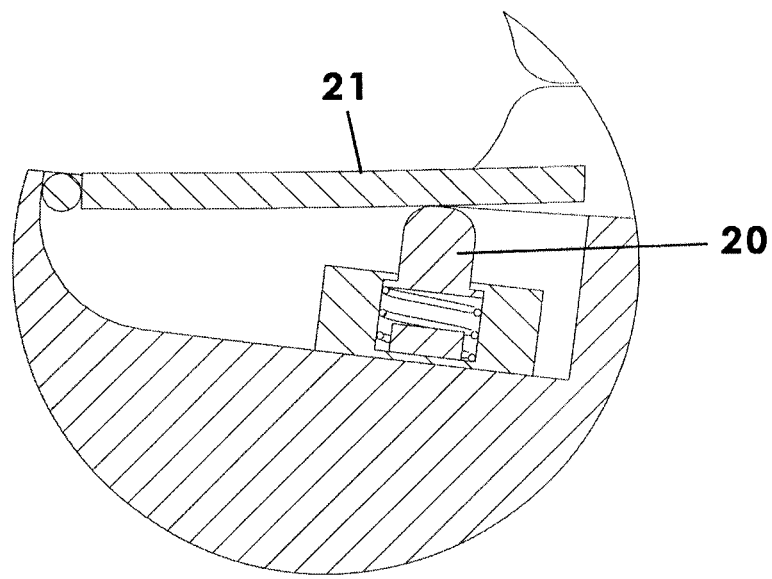
FIG. 2c is an isolated view on an enlarged scale taken from FIG. 2b, illustrating a pressure plate in an open configuration.
Figure 2D:
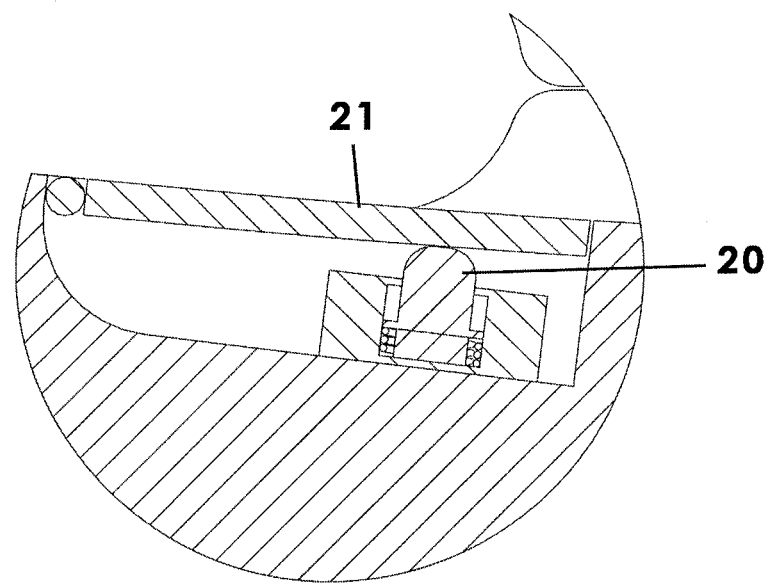
FIG. 2d is an isolated view on an enlarged scale taken from FIG. 2b, illustrating a pressure plate in a closed configuration.

A car seat occupancy alert system according to a preferred embodiment of the present invention will now be described with reference to FIGS. 1 to 11 of the accompanying drawings. The car seat occupancy alert system 10 includes an occupancy sensor 20 for use with an infant or toddler car seat 12 and engine sensor 22 in communication with a vehicle engine, and various audible and visual sensors to remind a driver and the general public that a child remains seated in the car seat 12 after the engine has been de-energized. The car seat occupancy alert system 10 may include a controller 24 (i.e. a control circuit) having circuitry or a processor for managing a host of sensors and alarm components.

An occupancy sensor 20 may be positioned on or in the seat of an infant car seat 12 that is configured to detect when a child is positioned in the seat. In an embodiment, the occupancy sensor 20 may be a pressure switch that is triggered when a predetermined amount of weight is experienced, such as the weight of a child upon a pressure plate 21 in contact with the sensor 20. Although a pressure switch is preferred, other occupancy sensors would also work such as a proximity sensor, a motion sensor, a heat sensor, or other suitable sensors of a person's presence on the seat. In addition, the occupancy sensor 20 may include a circuit operatively connected to a buckle associated with the car seat 12 and configured to detect when the seat belt has been released from the buckle. A buckle circuit is less desirable than a pressure switch in that it does not confirm that the child has been removed from the seat.

Figure 6:
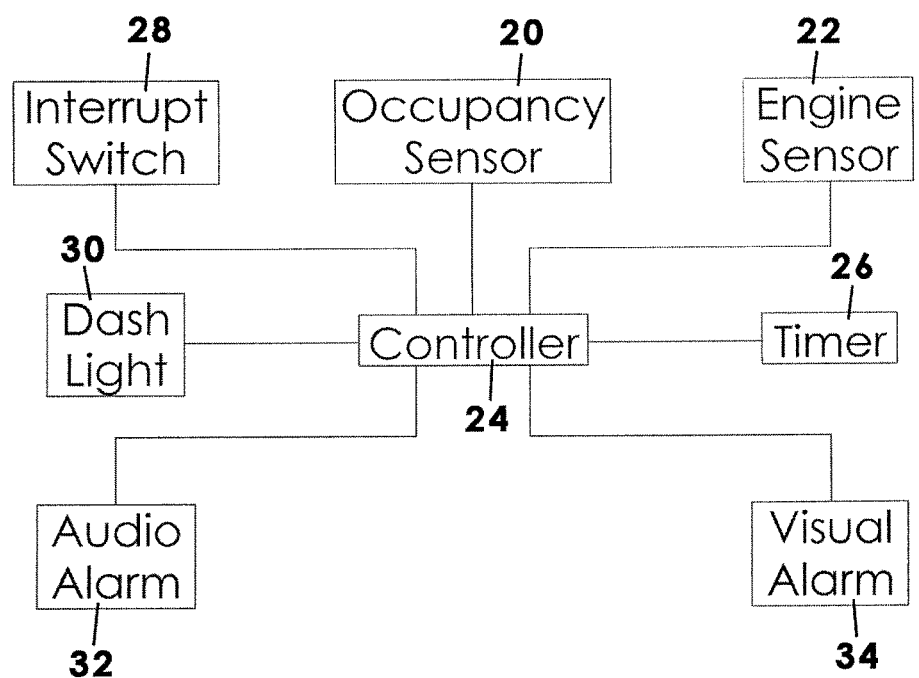
FIG. 6 is a block diagram illustrating the electronic components of the present invention.
Figure 7:
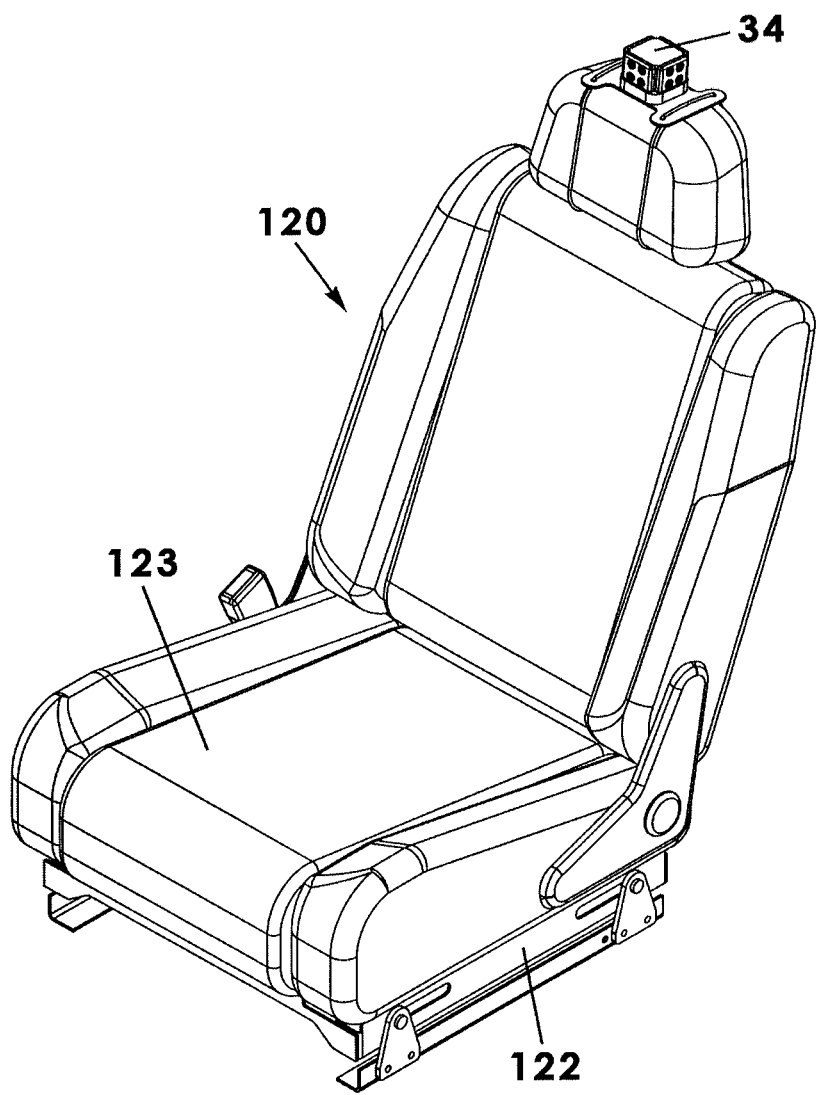
FIG. 7 is a perspective view of a car seat occupancy alert system according to a another embodiment of the present invention, illustrated in use on a vehicle passenger seat.
Figure 8:
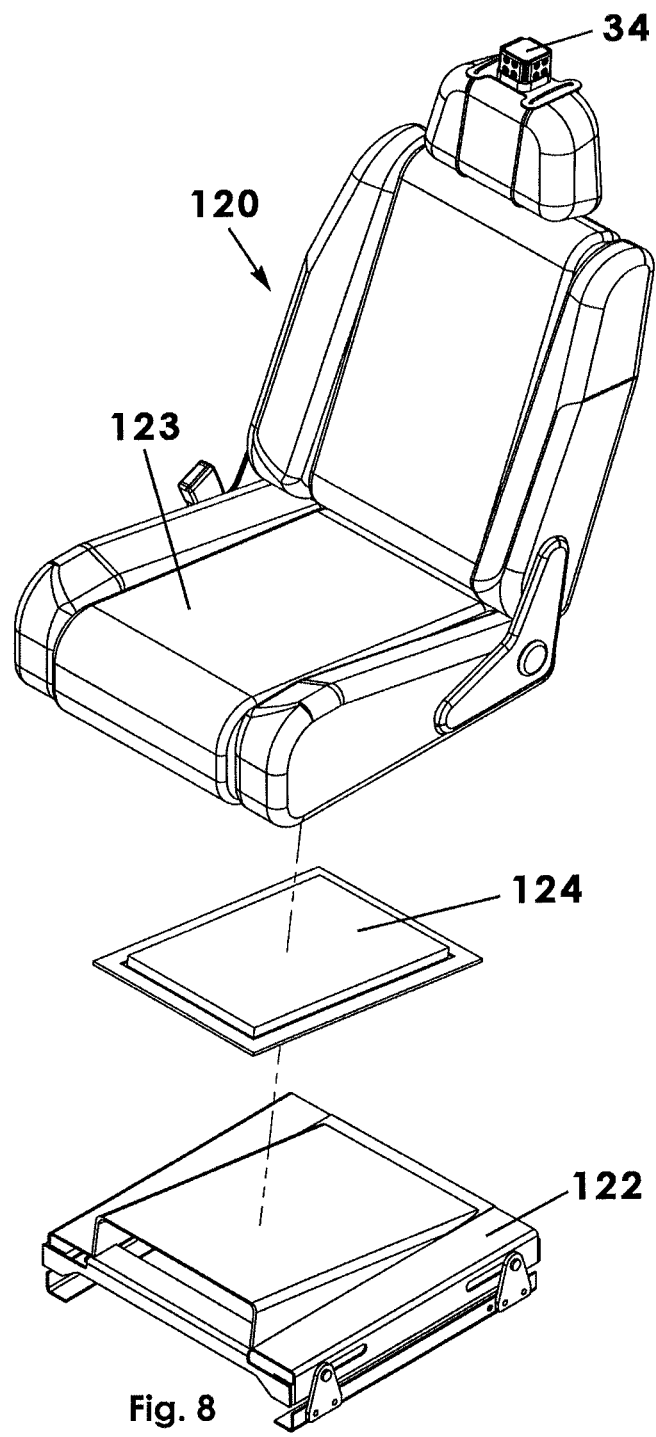
FIG. 8 is an exploded view of the car seat occupancy alert system as in FIG. 7.
Figure 9A:
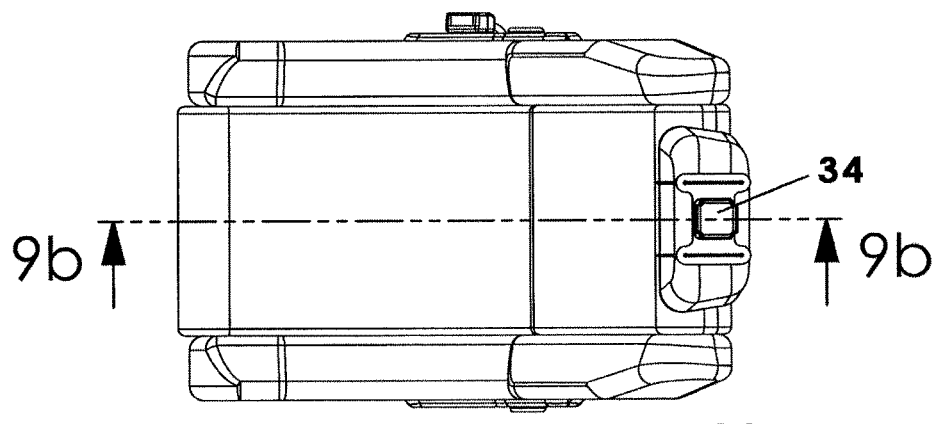
FIG. 9a is a top view of the car seat as in FIG. 7.
Figure 9B:
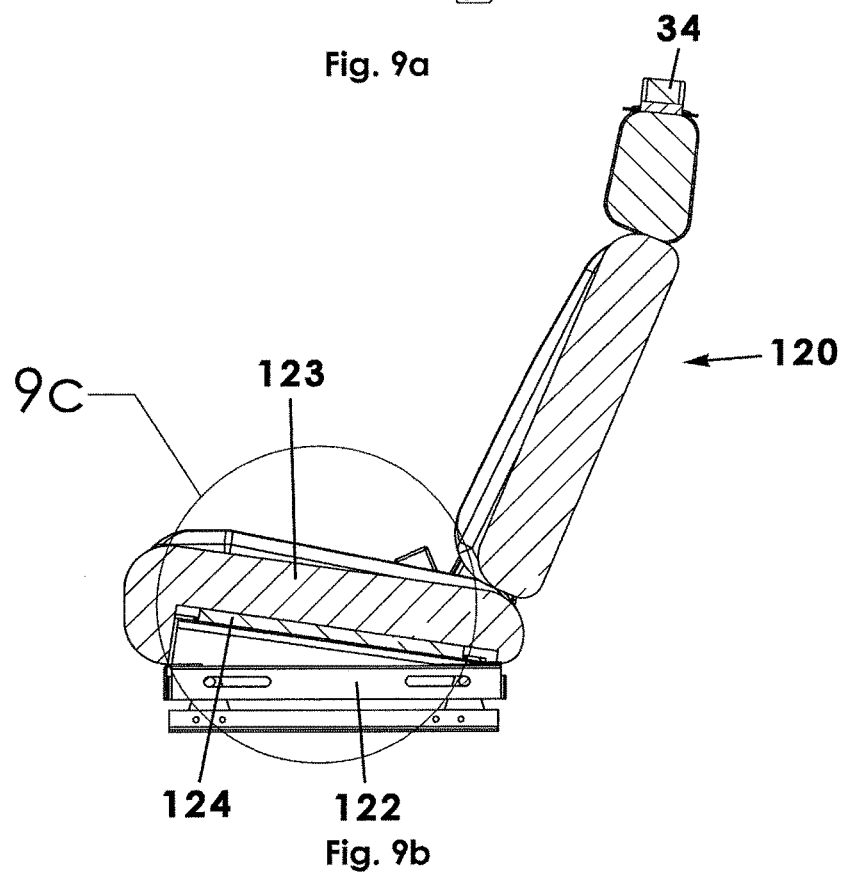
Figure 9C:
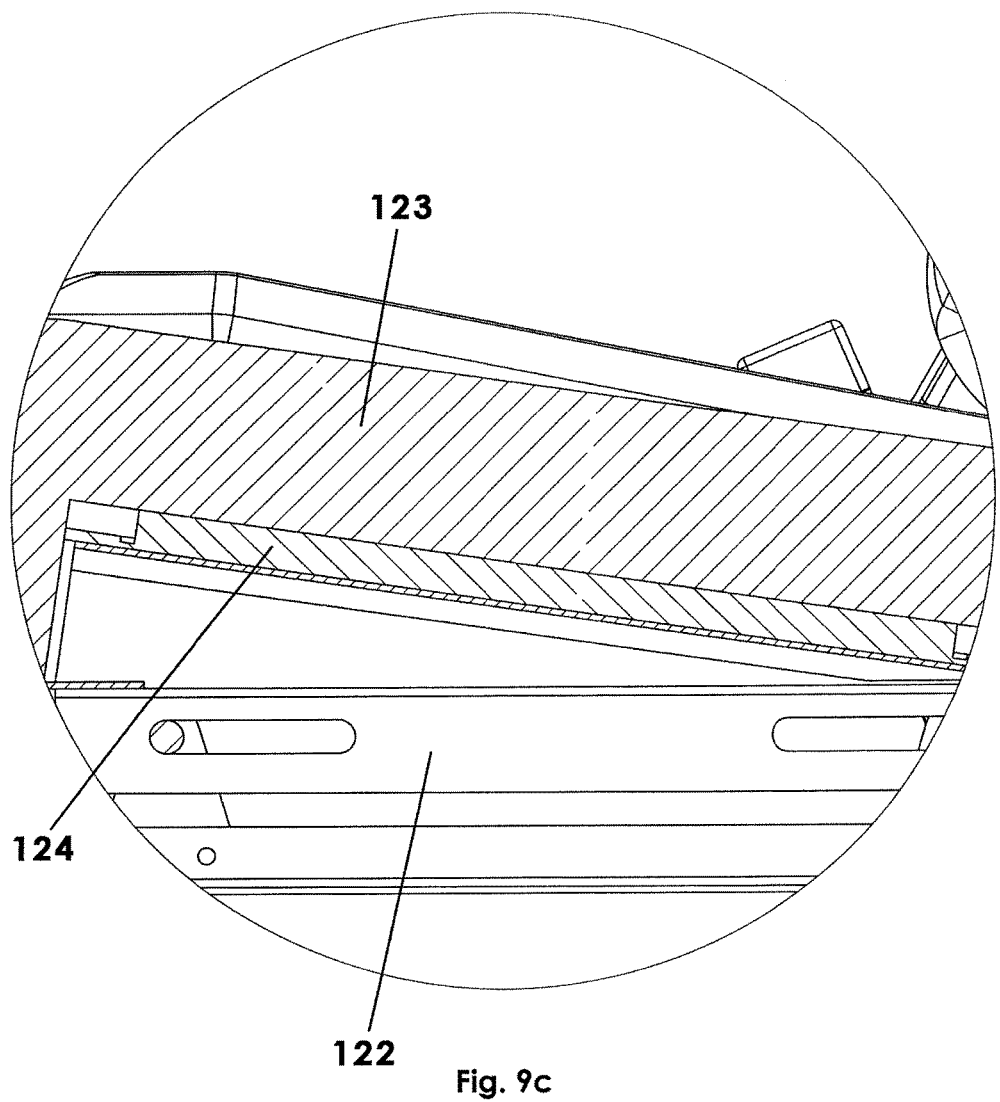
FIG. 9c is an isolated view on an enlarged scale taken from FIG. 9b.
Figure 10:
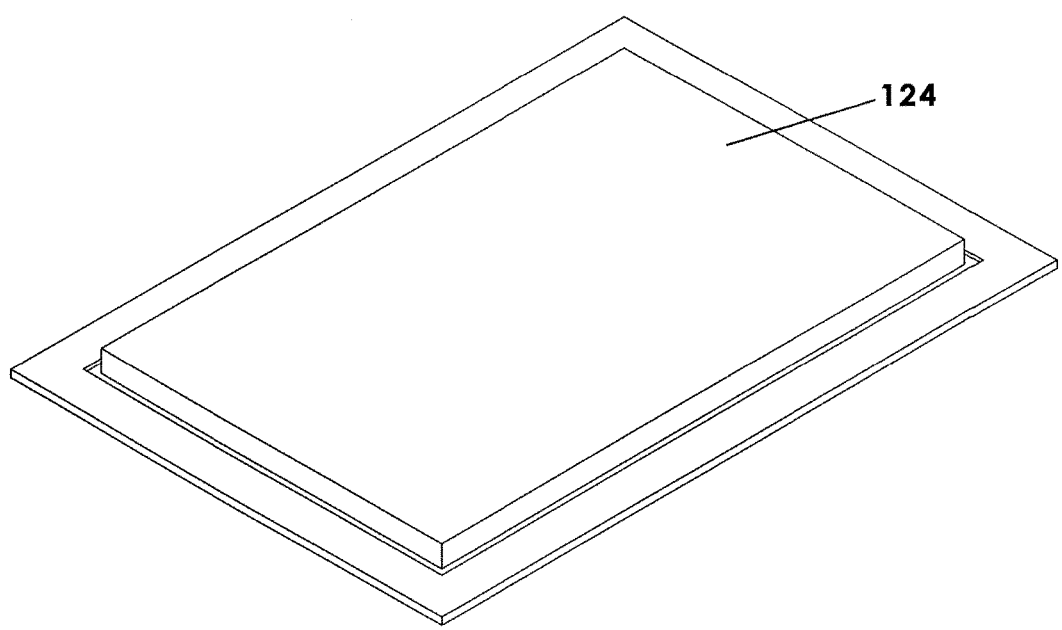
FIG. 10 is an isolated view on an enlarged scale taken from FIG. 8.
Figure 11:
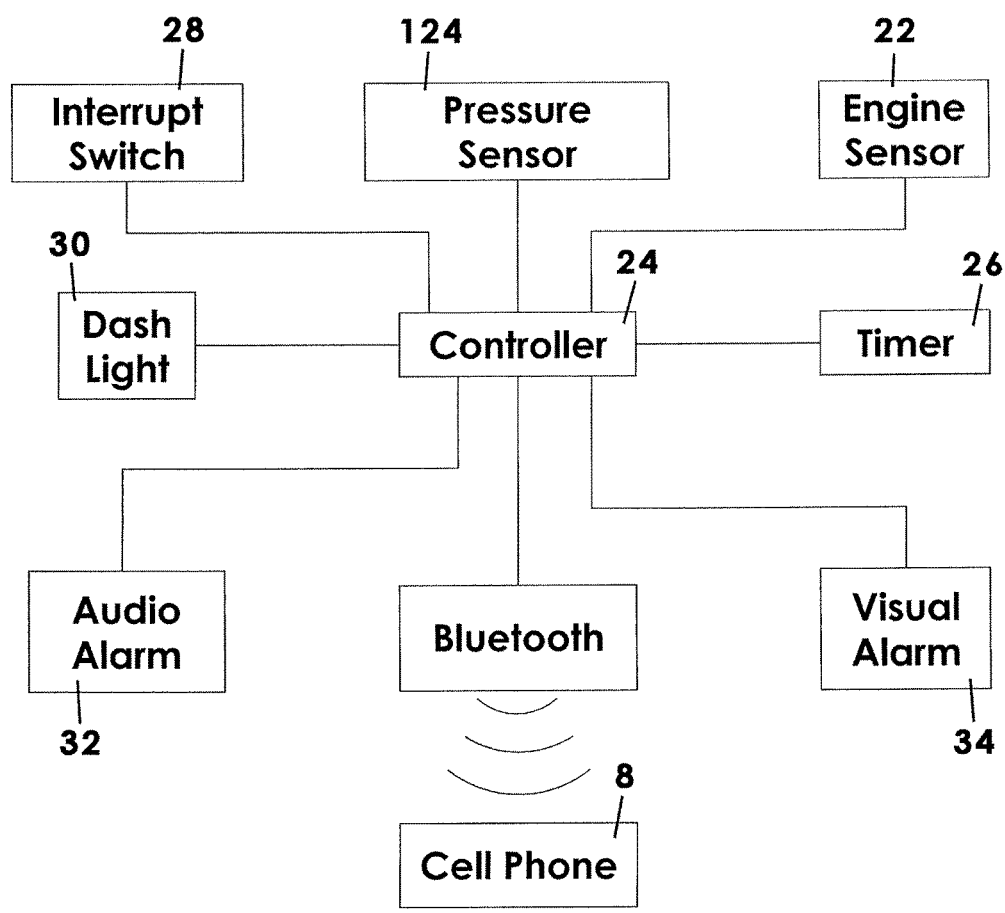
FIG. 11 is a block diagram illustrating the electronic components of the embodiment of the invention illustrated in FIG. 7.

The car seat occupancy alert system 10 may include a dash light 30. Specifically, the dash light 30 may be a light emitting diode ("LED") positioned on front console area of a vehicle's dashboard. This position is important in that the dash light 30 will be energized very soon after the vehicle engine is turned off as a reminder to the driver to retrieve a child from a back seat infant car seat, as will be described in more detail later. The car seat occupancy sensor 20 is electrically connected to the dash light 30, either hardwired or wirelessly. It is understood that the dash light 30 and occupancy sensor 20 may be electrically connected to the controller 24 which regulates operation thereof (FIG. 6).

The car seat occupancy alert system 10 also includes an engine sensor 22 electrically connected to the controller 24 and, indirectly, to the dash light 30. The engine sensor 22 provides a signal or data indicative of whether the vehicle's engine is running or, rather, has been turned off. So long as the engine is running, it is assumed that a baby or toddler occupying a car seat is not being left alone. However, when the engine sensor 22 detects that the vehicle's engine has been turned off, the controller 24 actuates a timer 26 to regulate a series of alerts to remind, first, the driver to retrieve a child from the car seat and, second, notify persons outside of the vehicle that a child remains in the seat as will be described in more detail later. It is understood that the timer 26 may be part of the controller's circuitry or may be an independent electrical component in electrical communication with the controller 24.

Further, the car seat occupancy alert system 10 may include a visual alarm 34, such as a flashing LED, rotational light source, or other high intensity light source. Preferably, the visual alarm 34 may be positioned atop the infant car seat 12. In an embodiment, the visual alarm 34 may be removably coupled to the car seat 12, such as with corresponding hook-and-loop fasteners although other fastening elements may also be used, such as clips, clasps, snaps, bolts, screws, or the like. In another embodiment, the visual alarm may in wireless communication with the controller 24 and positioned anywhere in the cabin of an automobile, such as on the dashboard, in the rear window, or even outside the car. The visual alarm 34 is electrically connected to the controller 24, whether with wires or wirelessly, and configured to be energized after a predetermined amount of time after the vehicle's engine is switched off but only if the occupancy sensor 20 detects the continued presence of a child in the seat 12 as will be described later.

Figure 3A:
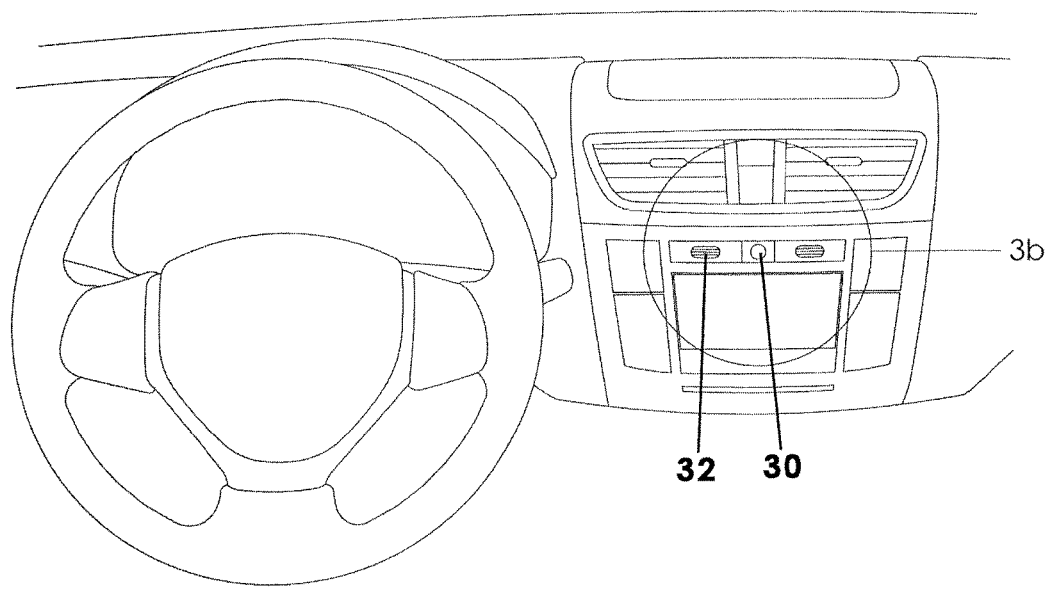
FIG. 3a is a perspective view of the alert system installed inside an automobile.
Figure 3B:
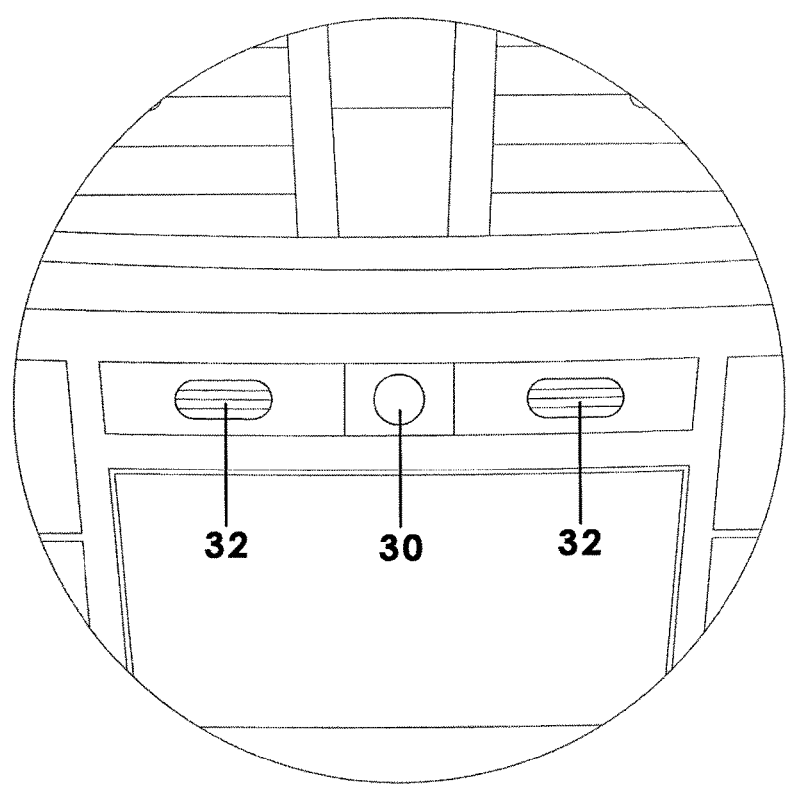
Figure 4A:
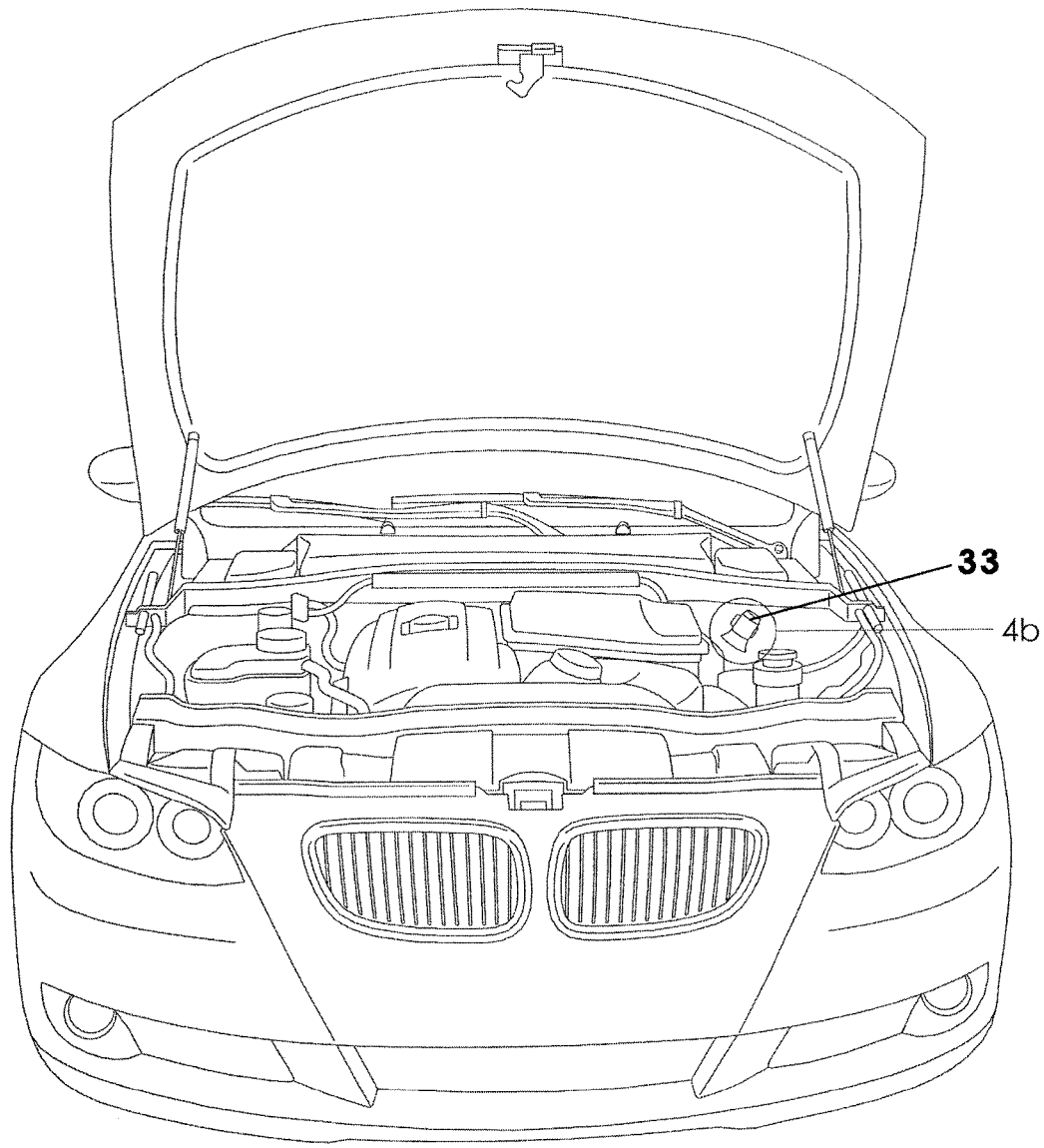
FIG. 4a is a perspective view of the engine of an automobile having an external speaker installed therein.
Figure 4B:
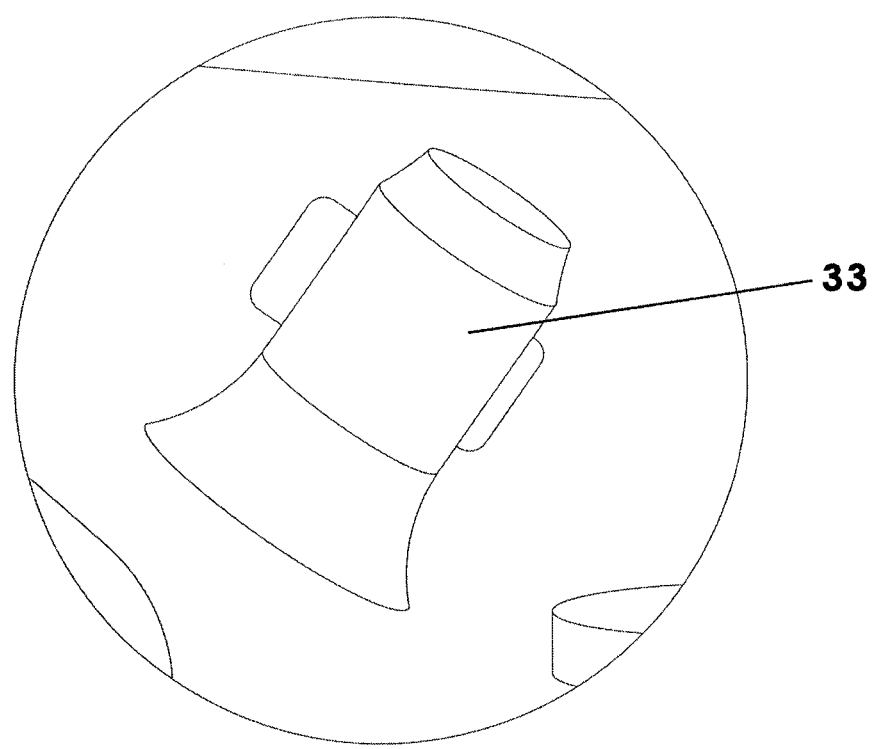

Similarly, the car seat occupancy alert system 10 may include an audio alarm 32 that, when energized by the controller 24, is effective to notify the driver and other persons in the proximity of the vehicle that a child is still occupying the child car seat 12. The audio alarm 32 may include more than one alarm component. For instance, an interior audio alarm may be electrically connected to the controller 24 and integrated into the vehicle's speaker system (FIG. 3a). The interior audio alarm is intended primarily to remind the driver to retrieve a child passenger from the car seat. In addition, the audio alarm 32 may include an exterior alarm 33 situated outside the cabin of the vehicle, such as in the engine compartment (FIG. 4a) or even coupled to the roof or side panels of the vehicle. The audible alarm 32 is electrically connected to the controller 24, whether with wires or wirelessly, and configured to be energized after a predetermined amount of time after the vehicle's engine is switched off but only if the occupancy sensor 20 detects the continued presence of a child in the seat 12 as will be described later.

The car seat occupancy alert system 10 may include an interrupt switch 28 mounted within the cabin of the vehicle and configured to enable the driver to add a predetermined amount of time to the timer 26 and, as a result, avoid setting off the alarms described above when the vehicle is switched off (FIG. 6). For example, if the driver desires to turn the vehicle off while pumping fuel into the vehicle's gas tank, the timer 26 and controller 24 need to be deactivated so that the alarms are not energized after the short predetermined times. The interrupt switch 28 may be in the form of a push button and is electrically connected to the controller 24, either with wires or wirelessly.

In another aspect, the car seat occupancy alert system 10 may include a communications module. The communications module may include cellular or signal processing components for contacting a 9-1-1 operator after a predetermined amount of time after the vehicle has been shut off if the occupancy sensor still indicates a baby has not yet been released from the seat. For instance, the dash light 30 may be illuminated after one minute, the audio and visual alarms may be energized after two minutes, and contacting emergency authorities may occur after 10 minutes. In an embodiment, the system 10 may include Bluetooth 25 capabilities such that an owner, driver, or designated cell phone may be signaled simultaneous or a predetermined time after the alarms are energized. Specifically, the controller 24 may be configured to actuate a transmission of an alert signal via Bluetooth 9 protocols in relation to when the audible and visual alarms are energized—thus, notifying the car driver's cell phone 8 or other designated resource of an emergency. Of course, the specifics regarding timing may be adjusted at the point of manufacture or even by a user during setup.

It is understood that the occupancy sensor in all aspects described above may be installed and operated upon a baby or infant car seat 12 as shown in FIG. 1a or on a full size (made for a child or adult) passenger seat 120 as shown in FIGS. 7 to 9b. More particularly, the passenger seat 120 may include a base 122 or framework and a seat portion 123 (upon which an occupant sits). The pressure sensor 124 (a.k.a. occupancy sensor), which may be in the form of a pressure plate, may be positioned immediately beneath the seat portion 123 and is actuated when a person is seated on the seat portion 123. The controller 24 is configured to detect activation of the pressure sensor 124 and to operate as described above. All other components that refer to those first described above will be designated with the same reference numerals used previously.

Figure 5:
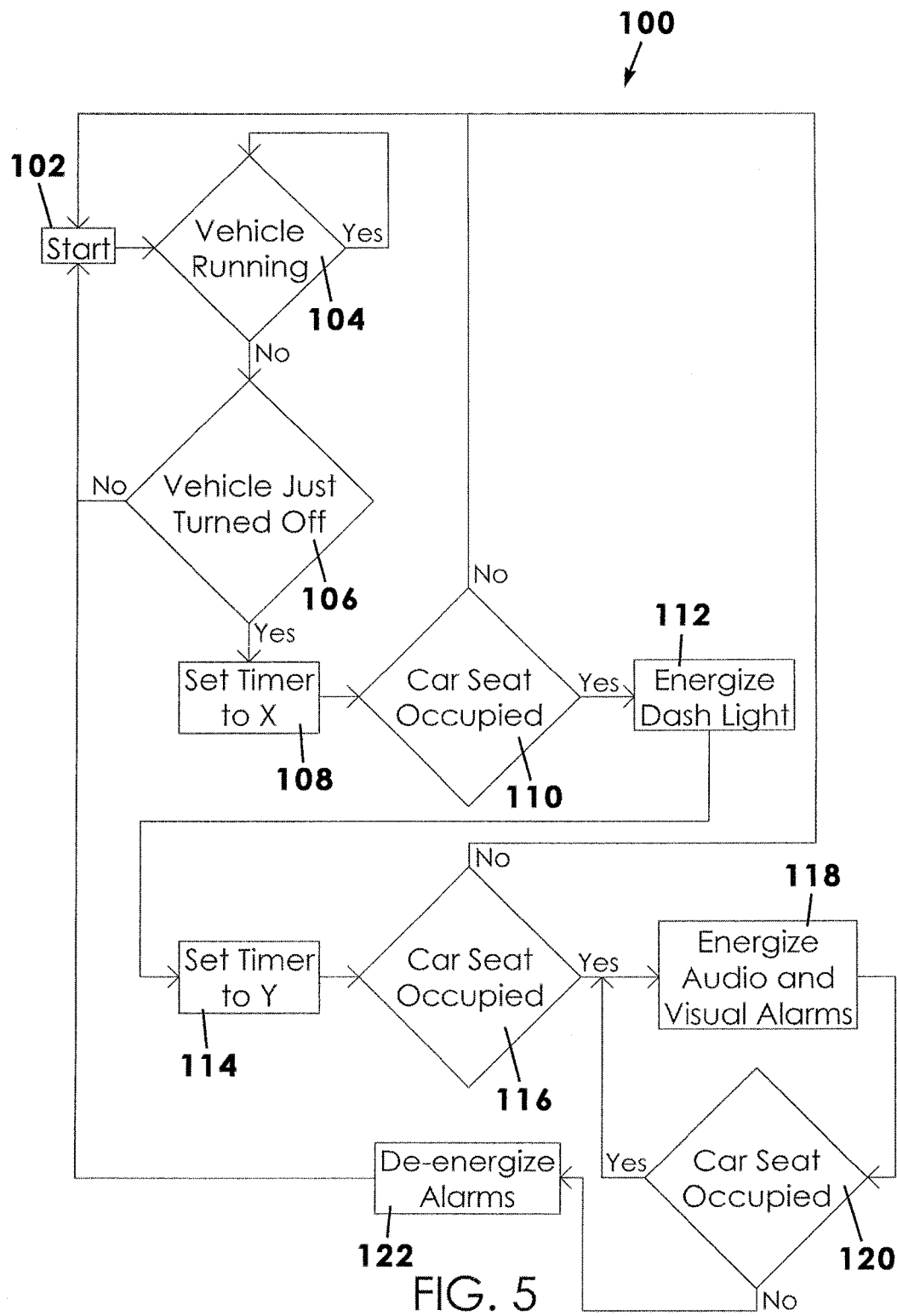
FIG. 5 is a flowchart illustrating the logic of a process executed by a controller according to the present invention.

An exemplary process 100 is illustrated in FIG. 5 and will now be described in order to more fully explain the car seat occupancy alert system 10. Process 100 begins at step 102 and proceeds to step 104. At step 104, the controller 24 determines if the vehicle's engine is currently running. If so, process 100 returns to step 104 and just continues to cycle until it is determined that the engine is not running. It is understood that the controller 24 determines if the vehicle is running by polling the engine sensor 22 to which it is electrically connected. If the controller 24 determines the engine is not running, process 104 proceeds to step 106.

At step 106, the controller 24 determines if the engine has just been turned off. In this step, the controller 24 may be instantly notified by the engine sensor 22 of an engine de-activation or may make a calculation based on time. If the controller 24 determines engine deactivation, the process 100 proceeds to step 108. At step 108, the controller 24 activates a timer 26 to count a predetermined number of seconds, which is referred to in the drawings as "x" amount of time. In an embodiment, the timer 26 may be actuated to count for 2 seconds. After the timer completes its delay, process 100 proceeds to step 110.

At step 110, the controller 24 determines if the vehicle car seat is occupied by a child, such as by polling the occupancy sensor 20 (e.g. a pressure switch). In an embodiment, the occupancy sensor 20 may send an impulse to the control circuitry automatically indicating its status. If the controller 24 determines that the car seat is occupied, then process 100 proceeds to step 112; otherwise, control is returned to step 104. If the seat is no longer occupied, then there is no child left in the car seat 12.

At step 112, the dash light 30 is energized so as to immediately remind a driver to remember to retrieve the child from the car seat before walking away from the vehicle. After the dash light 30 is energize to illuminate, the controller 24 proceeds to step 114 where it actuates the timer 26 to count another predetermined time, such as to delay further action by "y" number of seconds. For instance, a user may be given 60 seconds to retrieve the child from the car seat before a next alarm is activated. Of course, the number of seconds given at this point in the process may vary in various embodiments. Once the timer 26 has been actuated, process 100 continues to step 116.

At step 116, the controller 24 again determines if the car seat 12 is occupied, such as by checking the status of the occupancy sensor 20 (e.g. pressure switch). If the occupancy sensor 20 is indicative of the presence of a child in the seat, then process 100 proceeds to step 118; otherwise, process 100 concludes that the child has been retrieved and control returns to step 102. At step 118, the controller 24 energizes the audible alarm 32 and visual alarm 34 to activate. As described above, activation of the alarms may include playing a pre-recorded voice message such as "Remember your child!" or "Baby is left in this car!" or the like. The audio and visual alarms sufficiently loud and intense so as to instantly grab the attention of people near the car. Once the alarms are energized, process 100 continues to step 120.

At step 120, the controller 24 yet again determines if car seat is occupied. If so, control cycles to step 118 to continue the alarms; otherwise, process 100 proceeds to step 122. At step 122, the alarms are de-energized and terminated in recognition that the car seat 12 is clear of a child occupant. Process 100 then terminates or returns to step 102 to be ready to begin again.

It is understood that the present invention may be applied to a family automobile such as a car or minivan, as well as to multi-seat vehicles such as a full-size van or even school bus. Accordingly, multiple occupancy sensors may be simultaneously in communication with the processor and corresponding electronic components as described above. In the case of a bus, the alert system may be configured to activate an alarm or send an alert signal if even one seat is determined to still be occupied a predetermined time after the engine has been deactivated.

Accordingly, the car seat occupancy alert system 10 provides a mild reminder to a driver to retrieve a child from an onboard car seat very shortly after the vehicle is switched off and then more vigorously as time elapses. In this manner, the lives and well being of infants and toddlers may be saved and a forgetful parent is saved from a tragic or even criminal result.

It is understood that while certain forms of this invention have been illustrated and described, it is not limited thereto except insofar as such limitations are included in the following claims and allowable functional equivalents thereof.

The invention claimed is:

1. A seat occupancy alert system, for alerting that a child remains in a vehicle seat positioned in a cabin of a vehicle after the vehicle's engine has been deactivated, said occupancy alert system comprising:
    an occupancy sensor associated with the seat and configured to detect if the vehicle seat is occupied;
    an engine sensor in electrical communication with the vehicle and configured to detect if the vehicle's engine is running;
    a dash light configured to be positioned in the vehicle cabin;
    a visual alarm displaced from said dash light and removably attached atop the vehicle seat, said visual alarm configured for 360 degree visibility from outside the vehicle;
    an audible alarm;
    an electronic timer;
    a controller in data communication with said occupancy sensor, engine sensor, dash light, timer, and visual alarm, said controller having circuitry that is configured to:
        determine if the vehicle's engine has been deactivated;
        if the vehicle's engine has been deactivated, set said timer to a predetermined first time duration;
        when said first time duration has expired, determine from the occupancy sensor if the seat is occupied and, if so, energize said dash light;
        after said dash light is energized, set said timer to a predetermined second time duration;
        when said second time duration has expired, determine from said occupancy sensor if the seat is occupied and, if so, energize said audible and visual alarms;
        after said audible and visual alarms have been energized, determine from said occupancy sensor if the seat is occupied and, if not, de-energize said audible and visual alarms;
    a pressure plate configured to communicate with a sitting surface of the vehicle seat, said pressure plate being positioned upwardly adjacent to said occupancy sensor such so as to make contact therewith when the sitting surface experiences the weight of an occupant;
    an interrupt switch in electrical communication with said controller and, when actuated thereby, causes a predetermined additional amount of time to be added to said timer.

2. The seat occupancy alert system as in claim 1, further comprising an external audible alarm configured for attachment outside the vehicle cabin.

3. The seat occupancy alert system as in claim 1, wherein the seat is a baby car seat.

4. The seat occupancy alert system as in claim 1, wherein the seat is a passenger seat.

5. The seat occupancy alert system as in claim 1, wherein said controller is configured to transmit an alarm signal wirelessly when said audio and visual alarms are energized.

6. The seat occupancy alert system as in claim 1, wherein said visual alarm is a rotational light source.

7. The seat occupancy alert system as in claim 1, wherein said visual alarm is a high intensity light source.

* * * * *